United States Patent Office 3,449,448
Patented June 10, 1969

3,449,448
PROCESS FOR STABILIZING HALOBENZENES
AND METHYLBENZENES
Karl E. Kunkel, Grand Island, N.Y., assignor to Hooker Chemical Corporation, Niagara Falls, N.Y., a corporation of New York
No Drawing. Filed Aug. 31, 1964, Ser. No. 393,399
Int. Cl. C07c 17/40
U.S. Cl. 260—650                                 5 Claims This invention relates to a process for stabilizing halobenzenes and halomethylbenzenes and more particularly, to a process of stabilizing crude monochloromethylbenzenes to prevent the formation of acids and undesirable residues and the corrosion in processing and storage facilities resulting therefrom.

Halobenzenes and halomethylbenzenes include chlorobenzene, chlorotoluene, chloroxylene, bromobenzene, bromotoluene, bromoxylene, chlorotrimethylbenzene, bromotrimethylbenzene, and the like halogenated benzenes and methylbenzenes. Chlorotoluene is widely produced commercially by the reaction of chlorine with toluene in the presence of a metal halide catalyst. The metal halide catalyst effects the substitution of chlorine on the aromatic ring in preference to side chain substitution. Only trace substitutions are effected on the methyl side chain. Numerous processes and techniques are known for effecting this deaction including both continuous and batch type operations. Most of these processing techniques vary from one another primarily in methods of producing a preferred compound and minimizing the formation of undesired compound and aliphatic substitutions.

Although effective techniques are known to produce a predominance of a preferred compound, a certain amount of undesired halogenated materials is usually formed. During halogenation, unstable halogenated compounds are formed other than the desired aryl substituted halogen compounds. Such unstable compounds are the result of halogenation of impurities in the original aromatic compound as well as the aliphatic halogenation of the original methylbenzene. These unstable compounds are undesirable, even in trace amounts, since they will result in acid formation, discoloration of the product, and corrosion in subsequent refining processes and in storage.

Because the corrosion factor should be eliminated, previous methods neutralized the unstable halogenated compounds by reacting with sodium or potassium hydroxide solutions. The process of neutralizing or stabilizing with aqueous alkali hydroxide solutions has several disadvantages, particularly in that halobenzenes and halomethylbenzenes are preferably used in anhydrous form. The stabilization with an alkali hydroxide solution requires an additional step of subsequently removing water. Also, large quantities of alkali hydroxide solutions were required and frequently, the alkali treatment was not completely effective in removing all of the unstable material within the time available. In addition, alkali treatment only removes the impurities hydrolyzable under the conditions used.

It is an object of this invention to provide a method of stabilizing halomethylbenzenes. It is another object of this invention to provide a method of stabilizing halomethylbenzenes without alteration of aromatic substituted halogens. A further object of this invention is to provide a method of stabilizing crude halomethylbenzenes, rendering unstable contaminants inert to further reaction. These and other objects will become apparent to those skilled in the art from the description of the invention.

In accordance with the invention, a process for stabilizing halobenzenes and halomethylbenzenes containing unstable halogen compounds as impurities is effected by treating crude aromatically halogenated benzenes selected from the group consisting of halobenzene and halomethylbenzenes containing unstable halogenated compounds as impurities in the presence of a catalytic amount of a metal halide and heating to a temperature in the range of about one hundred degrees centigrade up to the boiling point of the mixture and thereby making the unstable components inert to further reaction.

This invention provides a convenient and simplified procedure for stabilizing aryl halogenated compounds so as to render the impurities inert to further reaction and to eliminate the corrosive properties of the desired product. This procedure is particularly useful and beneficial because only the undesired impurities are affected, all potentially corrosive unstable impurities are affected and not just the hydrolyzable impurities, and virtually no degradation or rearrangement of the aromatic halogenated substituents is effected. Also, the stabilization does not require the addition of aqueous reagents or large quantities of chemicals and therefore the desired product is obtained in anhydrous condition with a minimum of expense. An important advantage is that this process can be run continuously or batchwise.

The present process is effective in stabilizing aryl halogenated benzenes and aryl halogenated methylbenzenes wherein the halogen constituent is fluorine, chlorine, bromine, or iodine, wherein one to six halogens are aromatically substituted, wherein the methylbenzenes have one to five methyl substituents, and wherein the impurities or contaminants eliminated are unstable halogenated compounds.

The halomethylbenzenes stabilized by the process of this invention include fluorine, chlorine, bromine, and iodine, aromatically substituted benzenes and methylbenzenes such as monochlorobenzene, dichlorobenzene, trichlorobenzene, monobromobenzene, dibromobenzene, tetrabromobenzene, monochlorotoluene, dichlorotoluene, trichlorotoluene, monobromotoluene, monoiodotoluene, monochloroxylene, monobromoxylene, dikuroxylene, dichloroxylene, dibromoxylene, monochlorotrimethylbenzene, dichlorotrimethylbenzene, monobromodimethylbenzene, monochlorotetramethylbenzene, dichlorotetramethylbenzene, monobromotetramethylbenzene, monochloroheptamethylbenzene, monobromoheptamethylbenzene, and the like halogenated compounds containing unstable halogenated compounds as impurities.

The term "stabilizing" indicates the process of rendering substantially inert to corrosive reactivity the unstable components in the reaction mixture. The stabilization is the deliberate decomposition or reaction of the unstable materials resulting in the liberation of hydrogen halide as a by-product of such stabilization process and forming a product which on subsequent distillation yields a non-corrosive product. The unstable compounds rendered inert by the process of this invention are not entirely known. It is believed that the unstable compounds are present in the original aromatic material or result from the halogenation of impurities in the original aromatic materials and from the halogenation of the methyl side chains on the aromatic ring. Such unstable compounds include benzylhalides, benzalhalides and other aromatic and aliphatic acid compounds. The presence of such unstable compounds is readily determined by alkali neutralization, corrosion tests, and other analytical procedures.

The process of this invention is effected by the addition of a metal halide such as aluminum halide, zinc halide, or iron halide wherein the halogen preferably is the same as the halogen substituted on the aromatic ring of the desired product. Therefore, the metal halide catalysts used include aluminum chloride, aluminum bromide, zinc chloride, zinc bromide, zinc fluoride, aluminum fluoride, ferric fluoride, ferric chloride, ferric bromide, and the like. These catalysts are preferably used in anhydrous form. However, minor amounts of water contained in either the product or the catalyst have not been found to be detrimental to the stabilization reaction.

The amount if catalyst employed varies with the temperature used in effecting the stabilization of the product. In general, the catalytic amount used varies from about 0.01 percent to about 1 percent by weight of the unstabilized material and is most preferably in the range of 0.1 percent to 0.5 weight percent. In instances where a metal halide catalyst was used in the chlorination step and wherein the metal halide catalyst is still present in the unstabilized product, this amount of metal halide catalyst may provide part or all of the metal halide required to effect the stabilization.

The stabilization is effected by heating for a period of time sufficient to react the unstable components, liberate hydrogen halide and render inert to further corrosive reactivity the subsequently distilled product. The temperature to which the reaction mixture is heated varies from about one hundred degrees centigrade up to the boiling point of the reaction mixture. The preferred temperature is the boiling or reflux point of the reaction mixture. Lower temperatures can be used, but the reaction rates are slower. The use of subatmospheric or superatmospheric pressures to effect the reaction at lower or higher temperatures may also be used. However, where normal atmospheric pressures are satisfactory, it is simpler to employ them.

The time required to effect the reaction varies with the temperature, the amount of catalyst used and the nature and amount of unstable constituents in the reaction mixture. Normally, the reaction is effected within about 2 hours up to about 10 hours, the time required being usually indicated by the cessation of the hydrogen halide evolution.

The halogenation of the aromatics subsequently stabilized by the process of this invention such as benzene, xylene, toluene, trimethylbenzene, tetramethylbenzene and pentamethylbenzene, may be carried out by procedures well known in the art. For example, chlorine is reacted with toluene by passing chlorine gas through the toluene containing a Friedel-Crafts catalyst.

The invention will be readily understood with reference to the following examples which are illustrative of certain preferred embodiments of the present invention. Unless otherwise indicated, all temperatures are in degrees centigrade and all parts and percentages used herein are by weight.

Examples 1 through 3

The following experiment was run to determine the comparative effectiveness of the present procedure versus caustic treatment. Monochlorotoluene was prepared by chlorinating toluene at a temperature of forty-five degrees centigrade in the presence of 0.10 percent anhydrous ferric chloride by weight of toluene. The chlorination was continued until the specific gravity indicated that monochlorotoluene had been formed. Analysis by gas chromatography indicated that the monochlorotoluene formed was comprised primarily or ortho- and parachlorotoluene and minor percentages of aliphatic chlorinated organics such as benzylchloride, benzalchloride, in addition to traces of several unidentifiable compounds.

To determine the effectiveness of the present procedure compared to the known caustic stabilization procedures, samples of the prepared crude monochlorotoluene were treated to stabilize the product and these samples were subsequently tested to determine the effectiveness of the stabilization procedure. The stabilized samples were analyzed for residual hydrolyzable chloride by agitating the sample with 20 percent aqueous sodium hydroxide at a temperature of ninety degrees centigrade in a vigorously stirred reactor.

The ultimate criterion of effective stabilization is the absence of acidic vapors when the stabilized product is heated to the boiling point. The caustic test is primarily a quantitative test for residual hydrolyzable impurities. Even though a product shows very little hydrolyzable halide, it may still contain impurities that decompose to yield corrosive materials when heated. Thus, a corrosion test or reflux vapor pH test should be conducted to insure inertness of the stabilized product.

Table I shows the results obtained in determining the effectiveness of various stabilizing procedures by measuring residual hydrolyzable halide and acidity of the reflux vapors of stabilized products. Examples 1 and 2 use known procedures while Example 3 is the procedure of this invention. The time indicated in Table I relates to the time of hydrolyzing the treated and distilled product and the results further indicate the amount of hydrolyzable chlorine removed by the subsequent additional treatment with 20 percent aqueous sodium hydroxide after the product had been stabilized and distilled by the various methods indicated below.

TABLE I

| | Vapor acidity | Residual hydrolyzable chlorine mg./100 g. product alkali reaction time, 2 hrs. |
|---|---|---|
| Example 1 | Positive | 33.7 |
| Example 2 | do | 28.0 |
| Example 3 | Negative | 2.1 |

The more effective the procedure used to stabilize crude monochlorotoluene, the smaller the quantity of hydrolyzable chlorine detected. Therefore, the smaller the number indicated in the preceding table, the more efficient the stabilization method. Vapor acidity indicates the presence or absence of acid in the refluxing vapors and is a qualitative measure of the effectiveness of the stabilization procedure.

Example 1 of Table I shows the results obtained by water washing at room temperature and subsequently distilling a crude mixture of predominately ortho- and para-monochlorotoluene to remove the water soluble chlorides. The amount of remaining hydrolyzable chlorides, however, is high and the vapor is acidic. These conditions would result in extensive corrosion attack in refining equipment and subsequent storage facilities.

Example 2 shows the results obtained using a 20 percent aqueous sodium hydroxide wash at room temperature for a period of three hours to remove soluble chlorides and those hydrolyzed by the caustic wash under the conditions. The product was then distilled prior to testing. This procedure removes more undesirable chlorides than a water wash but is not adequate to reduce the hydrolyzable chlorine content sufficiently to lower corrosive attack in refining equipment and subsequent storage vessels without a prolonged treatment. Also, the vapor acidity test was positive.

Example 3 shows the results obtained using the stabilizing method of the present invention wherin ferric chloride was added to a sample of the same crude monochlorotoluene used in Examples 1 through 3 and heated in accordance with the present invention. The procedure used was to add 0.1 percent anhydrous ferric chloride by weight of monochorotoluene. The monochlorotoluene was then heated to a reflux temperature of one hundered fifty-eight degrees centigrade and maintained at reflux for three hours. The amount of hydrolyzable chlorine remaining in the monochlorotoluene was much lower than after the caustic wash and water wash treatments and distillation vapor acidity test was negative. This procedure eliminated the danger of corrosive attack in subsequent refining steps and storage facilities.

Example 3 shows greatly improved stability of chlorinated aromatics by removal of unstable combined chlorine and other acidic impurities from the crude product. The improvement is readily noted by examination of Table I. It is to be noted that the present method does not require large amounts of stabilizing reactants and also provides an anhydrous product, whereas a caustic treatment or water wash requires a subsequent separation of water from the treated product so as to obtain the desired anhydrous product.

Analysis of the monochlorotoluene stabilized by the methods of Example 3 indicated that the aromatic halogen constituent was not rearranged, dehalogenated, or otherwise adversely affected.

Example 4

A crude mixture of predominately 2,4,6-trichlorotoluene was stabilized and a purified non-corrosive product was obtained in accordance with the present invention as follows: Commercial grade toluene was chlorinated in the presence of 0.2 weight percent zinc chloride until it was determined that an average of three atoms of chlorine per toluene molecule had been substituted. The crude trichlorotoluene was then stabilized by heating the product to a reflux temperature of two hundred and thirty-eight degrees centigrade in the presence of 0.2 weight percent zinc chloride for two hours. During the reflux period, hydrogen chloride volatilized and escaped from the reaction mixture. The stabilized product was then separated from the catalyst and residue by distillation. A corrosion test on a steel coupon, and quantitative determinations of hydrolyzable chlorine, indicated that the stabilized product was non-corrosive and contained only trace amounts of hydrolyzable chlorine, whereas an alkali washed and distilled sample of the same crude trichlorotoluene was corrosive and contained a small amount of hydrolyzable chlorine.

It is thus seen that the present invention eliminates or stabilizes various corrosive compounds in the halobenzenes and halomethylbenzenes, not just those hydrolyzed by alkali, so that the stabilized product of this invention is low in hydrolyzable halogen and other unstable halogen.

Example 5

A crude mixture of predominately ortho- and para-bromotoluene was stabilized, and a purified non-corrosive product was obtained in accordance with the present invention as follows: Commercial grade toluene was brominated with gaseous bromine at seventy degrees centigrade in the presence of 0.2 weight percent $FeBr_3$ until it was determined by specific gravity that bromotoluene had been formed. The crude bromotoluene was then stabilized by heating the product to a reflux temperature of one hundred eighty-eight degrees centigrade in the presence of 0.25 weight percent $FeBr_3$ for five hours. During the reflux period, hydrogen bromide volatilized and escaped from the reaction mixture. The stabilized product was then separated from the catalyst and residue by distillation. Comparative tests were made of the product stabilized by the above procedure with a sample of room temperature, five hour caustic washed and distilled crude product and a sample of room temperature water washed and distilled crude product. The bromotoluene stabilized by the method of this invention contained less hydrolyzable bromine than either of the caustic washed or water washed products.

Example 6

A crude mixture of monochloroxylene was stabilized and a purified non-corrosive product was obtained in accordance with the present invention by first chlorinating commercial grade xylene in the presence of 0.1 weight percent $FeCl_3$ until monochloroxylene was produced. The crude monochloroxylene was then stabilized by heating the product to reflux at a temperature of one hundred seventy-eight degrees centigrade in the presence of 0.1 weight percent $FeCl_3$ for three hours. The stabilized product was then distilled from the catalyst and residue. Comparative corrosion tests and quantitative determinations of hydrolyzable chlorine with a three hour caustic washed and subsequently distilled sample of the same crude monochloroxylene showed the superiority of the process of this invention. The caustic washed product had an acidic vapor at reflux and contained 5.8 milligrams hydrolyzable chlorine per 100 grams product. The product stabilized by the present method had a neutral vapor at reflux and contained only 1.0 milligrams hydrolyzable chlorine per 100 grams product.

Example 7

Monochlorobenzene was prepared by chlorinating commercial grade benzene with gaseous chlorine at fifty degrees centrigrade in the presence of 0.1 weight percent ferric chloride. The crude monochlorobenzene was then stabilized by heating to a reflux temperature of one hundred twenty-eight degrees centigrade with 0.20 weight percent ferric chloride for three hours. The mixture was then distilled to recover purified monochlorobenzene. This product was analyzed for hydrolyzable chlorine and found to be lower in hydrolyzable chlorine than a similar sample of monochlorobenzene that was caustic washed for three hours and subsequently distilled.

Other halomethylbenzenes and halobenzenes were stabilized by the method of this invention using aluminum halides, zinc halides and ferric halides in various amounts. In each instance, the stabilized product by the method of this invention was superior to a caustic washed or water washed product.

While there have been described various embodiments of the invention, the methods described are not intended to be understood as limiting the scope of the invention, as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A method of stabilizing aromatic compounds selected from the group consisting of ring halogenated benzene, ring halogenated toluene, and ring halogenated polymethyl substituted benzene, comprising refluxing said compound with a catalytic amount of a metal halide selected from the group consisting of zinc halide and ferric halide allowing the volatilized hydrogen halide to escape from the reaction mixture, said refluxing being carried out until the hydrogen halide evolution ceases, said halide an dthe ring halogenated substituents being selected from the group consisting of chlorine and bromine and recovering the stabilized compound by distillation.

2. The method of claim 1 wherein the metal halide is from 0.01 to 1.0% by weight of the reactants.

3. The method of claim 2 wherein the metal halide is ferric chloride.

4. The method of claim 2, wherein said halogenated aromatic compound is monochlorotoluene.

5. A method of stabilizing a crude mixture of ortho- and para-monochlorotoluene comprising treating said crude mixture containing unstable chlorine compounds as impurities with 0.1 to 0.5 percent by weight of ferric chloride, refluxing for about two to about 10 hours, allowing the volatized hydrogen chloride to escape from the reaction mixture and subsequently distilling the mixture to obtain a stabilized monochlorotoluene.

References Cited

UNITED STATES PATENTS

| 2,542,225 | 2/1951 | West | 260—651 |
|---|---|---|---|
| 2,523,707 | 9/1950 | Miller | 260—650 XR |
| 2,805,264 | 9/1957 | Kissling | 260—650 |
| 3,219,688 | 11/1965 | Weil | 260—650 XR |

FOREIGN PATENTS

| 621,070 | 5/1961 | Canada. |
|---|---|---|
| 886,991 | 1/1962 | Great Britain. |

LEON ZITVER, *Primary Examiner.*

PO-1050
(5/69)

UNITED STATES PATENT OFFICE
CERTIFICATE OF CORRECTION

Patent No. 3,449,448            Dated June 10, 1969

Inventor(s) Karl E. Kunkel

It is certified that error appears in the above-identified patent and that said Letters Patent are hereby corrected as shown below:

Column 1, line 30, delete "deaction" and insert --- reaction ---.
Column 1, line 34, delete "compound" and insert --- compounds---.
Column 2, line 50, delete "dikuroxylene" and insert --- difluoroxylene ---.
Column 3, line 9, delete "acid" and insert --- acidic ---.
Column 4, line 45, Table I, last column, delete "33.7" and insert
    --- 33.0 ---.
Column 4, line 46, Table I, last column, delete "28.0" and insert
    --- 28.7 ---.

SIGNED AND
SEALED
NOV 17 1970

(SEAL)
Attest:

Edward M. Fletcher, Jr.
Attesting Officer

WILLIAM E. SCHUYLER, JR.
Commissioner of Patents